Figure 1:
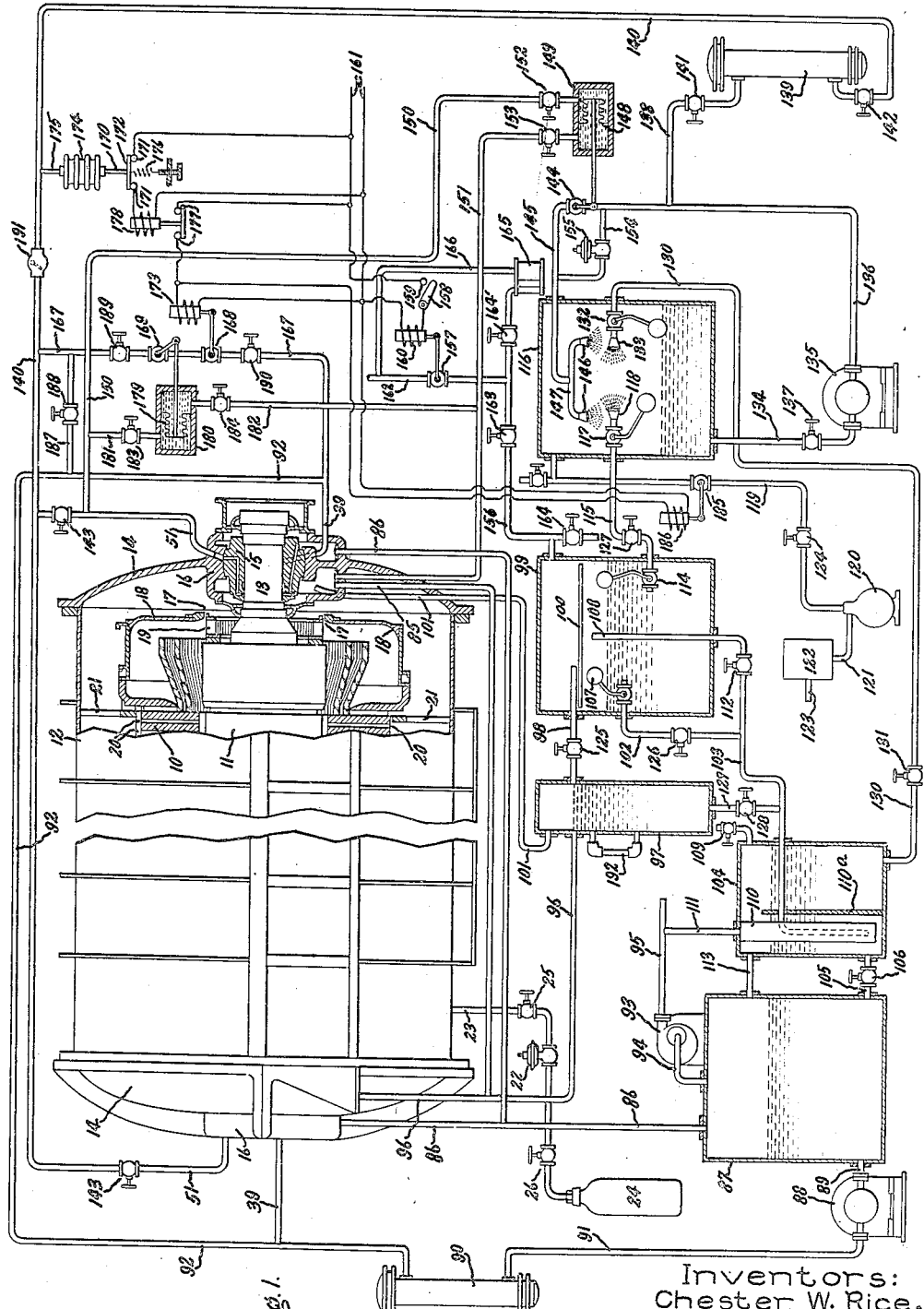

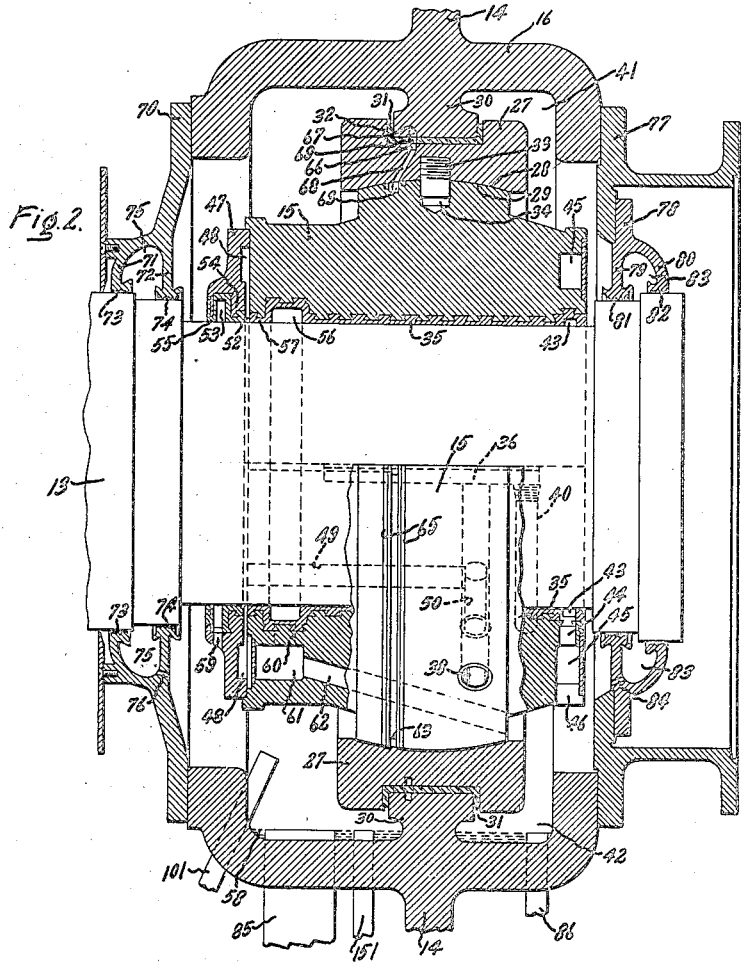

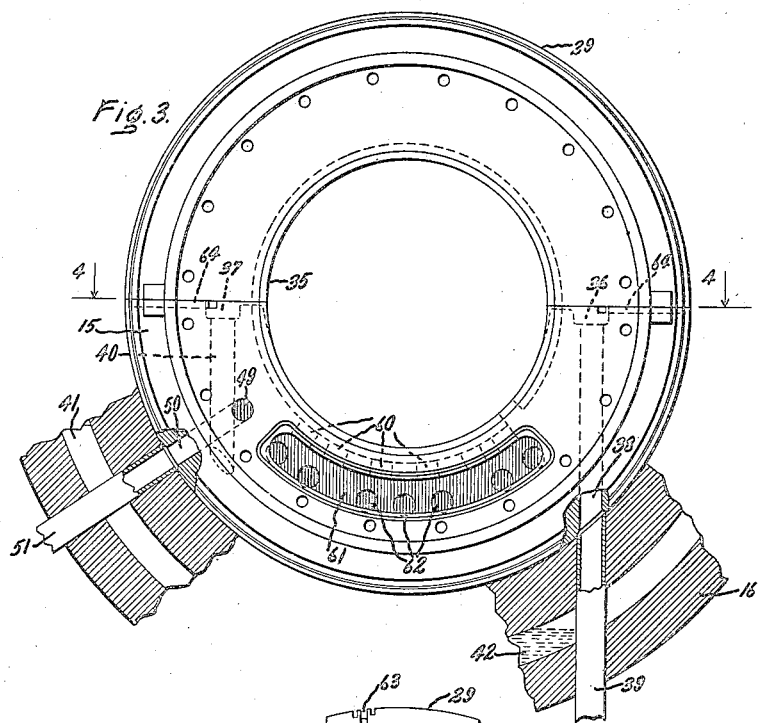

Patented Mar. 25, 1941

2,236,274

UNITED STATES PATENT OFFICE 2,236,274

LIQUID FILM SEAL

Chester W. Rice and De Witt S. Snell, Schenectady, N. Y., assignors to General Electric Company, a corporation of New York Application June 25, 1938, Serial No. 215,793

16 Claims. (Cl. 308—36.3)

Our invention relates to liquid film seals for preventing the escape of gas between the shaft and the enclosing casing of gas filled machines, such as hydrogen cooled dynamo-electric machines.

In dynamo-electric machines of this type, an enclosing casing is provided which is filled with a ventilating gas which is circulated therein and through the machine to ventilate the various windings and parts of the machine. Openings are arranged in the ends of the enclosing casing for the shaft of the machine and bearings are arranged adjacent the ends of the enclosing casing to support the shaft and a rotatable member of the machine. In order to prevent the loss of ventilating gas from the enclosing casing by leakage into the surrounding atmosphere and to prevent contamination of the ventilating gas in the enclosing casing by leakage of air thereinto, a seal is provided between the shaft and the enclosing casing adjacent each of the openings in the enclosing casing.

An object of our invention is to provide an improved seal of the liquid film type for gas filled dynamo-electric machines which is of simple construction and effective in operation.

Another object of our invention is to provide an improved arrangement for liberating gas entrained in the sealing liquid drained from a seal of the liquid film type and for returning the liberated gas to the enclosing casing of a gas filled machine provided with the liquid film seal.

Further objects and advantages of our invention will become apparent from the following description, and the features of novelty which characterize our invention will be pointed out with particularity in the claims appended to and forming a part of this specification.

For a better understanding of our invention reference may be had to the accompanying drawings in which Fig. 1 is a fragmentary side elevational view, partly in section, of a gas filled dynamo-electric machine embodying our invention and diagrammatically illustrating a lubricant and sealing fluid system for a bearing and a liquid film seal for the machine; Fig. 2 is an enlarged sectional view of one of the bearings and the liquid film seals shown in Fig. 1; Fig. 3 is an end view of the bearing shown in Fig. 2 and fragmentary sections of the supporting ring; and Fig. 4 is a plan view of the lower portion of the bearing taken along line 4—4 of Fig. 3.

Referring to the drawings, in Fig. 1, we have shown a dynamo-electric machine including a stationary member 10 and a rotatable member 11, the machine being provided with an enclosing casing 12 filled with a ventilating gas other than air, such as hydrogen. The rotatable member 11 is mounted upon a shaft 13, which extends through the end walls 14 of the enclosing casing 12. The shaft 13 is supported in bearings 15 supported by bearing housings 16 carried by the end walls 14 of the enclosing casing 12. In order to effectively ventilate and cool the dynamo-electric machine, the ventilating gas within the enclosing casing 12 is circulated therein and through the various windings and parts of the machine and gas coolers. This gas is drawn from the end of the enclosing casing 12 through an opening 17 provided in the end of a fan casing 18 surrounding a fan 19 carried by the rotatable member 11 and is discharged into the air gap between the stationary member 10 and the rotatable member 11 of the dynamo-electric machine and into other axial ventilating passages. The ventilating gas then flows outwardly through a plurality of radially disposed ducts 20 arranged between the laminations of the stationary member 10 into a plurality of passages 21 extending between the ends of the enclosing casing 12 and arranged between the enclosing casing and the stationary member 10 of the dynamo-electric machine.

Under various operating conditions of the dynamo-electric machine it is desirable to maintain different ventilating gas pressures within the enclosing casing 12. This is accomplished by an arrangement including an adjustable pressure regulating valve 22 interposed in a conduit 23 connected between the enclosing casing 12 and a high pressure ventilating gas container 24. By adjusting the pressure regulating valve 22 any desired pressure over a predetermined range of pressures may be maintained in the enclosing casing 12. Also, a valve 25 is provided in the conduit 23 for isolating the enclosing casing 12 from the pressure regulating valve 22 and a valve 26 is provided in the conduit 23 for isolating the high pressure ventilating gas container 24 from the pressure regulating valve 22.

As shown in detail in Figs. 2, 3, and 4, each of the bearing housings 16 is provided with a split supporting ring 27 having a universal joint bearing support including a concave surface 28 which engages a convex surface 29 provided on the bearing element 15 for supporting the bearing element to provide for alignment thereof with respect to the shaft 13. Under certain conditions it is desirable that the bearing should be electrically insulated from the machine end shield. In order thus to insulate and support the bearing 15, the bearing housing 16 is formed with an inwardly extending annular flange 30 which engages a split annular channel insulating ring 31 arranged in a circumferentially extending groove 32 formed around the outer surface of the split supporting ring 27. A dowel pin 33 is threadedly secured to the supporting ring 27 and extends into a hole 34 in the upper outer face of the bearing 15 to secure it in position with respect to the stationary bearing housing 16. The bearing element 15 is also provided with a cylindrical bearing face 35 in which an end of the shaft 13 is journaled. An axially extending recess 36 is provided on one side of the bearing face 35 adjacent the shaft 13 for supplying lubricant under pressure between the bearing face 35 and the shaft 13 and a similar axially extending recess 37 is formed in the bearing face on the other side to drain off excess lubricant. The recess 36 communicates with a passage 38 formed in the bearing element 15 and a lubricant supply pipe 39 secured in the bearing housing 16. The drain recess 37 communicates with a drain passage 40 extending through the bearing element 15 and communicates with an enlarged annular chamber 41 formed in the bearing housing 16 to provide a bearing lubricant sump 42 adjacent the outer end of the shaft 13. An annular groove 43 also is formed in the bearing face 35 adjacent the outer end of the shaft 13 so that lubricant which flows outwardly along the shaft will be drained therein. A plurality of openings 44 extends outwardly from the groove 43 to an annular drainage chamber 45 formed on the outer edge of the bearing, and lubricant collected in the groove 43 drains through these openings 44 to the chamber 45 and out to the lubricant sump 42 through openings 46 which extend between the chamber 45 and the sump.

A shaft sealing member is provided which includes an annular sealing ring 47 rigidly connected to the inner end of the bearing element 15 adjacent the interior of the enclosing casing 12 and cooperates with the bearing element 15 to provide an annular chamber 48 surrounding the shaft 13 and containing sealing liquid under pressure for providing a seal of the liquid film type about the shaft 13 and for preventing the escape of gas from the enclosing casing 12. The sealing liquid, which comprises lubricant of the character of that supplied to the bearing face, is supplied to the chamber 48 under pressure through passages 49 and 50 formed in the bearing element 15 which communicates with a sealing fluid supply pipe 51 secured in the bearing housing 16. The inner portion of the face of the annular sealing ring 47 adjacent the inner end of the bearing element 15 is spaced axially a short distance therefrom to provide a narrow annular passage 52 between the chamber 48 and the surface of the shaft 13. An annular recess 53 is provided in the annular sealing ring 47 and is interposed between the narrow annular passage 52 and the interior of the enclosing casing 12, being separated from the narrow annular passage 52 by a dividing wall 54. Another sealing surface 55 is provided between the outer face of the annular sealing ring 47 and the annular recess 53 therein.

The sealing arrangement also includes an annular recess 56 for collecting sealing liquid which flows toward the bearing. This recess is formed in the bearing face 35 of the bearing element 15 adjacent the narrow annular passage 52 and is separated from the narrow annular passage 52 by a dividing wall 57. The sealing ring 47 and the wall 57 are both arranged to carry a portion of the bearing load and to be aligned with the bearing on the spherical supporting surface 28. In order to drain excess sealing fluid from the seal, a sealing fluid sump 58 is formed in the bearing housing 16 adjacent the interior of the casing 12, and the annular recess 53 in the sealing ring 47 communicates with the sealing liquid sump 58 through several passages 59 formed in the lower portion of the annular sealing ring 47. The annular recess 56 communicates with the lubricant sump 42 through a number of drain passages 60, which communicate with an arcuate slot 61 and drain passage 62 formed in the bearing element 15.

An annular recess 63 is formed in the convex bearing surface 29 of the bearing element 15 adjacent the concave bearing seat 28 of the bearing supporting ring 27, and contains sealing liquid under pressure for providing a seal between the surfaces 28 and 29 to prevent the escape of ventilating gas from the enclosing casing 12 between these surfaces. Sealing fluid is supplied to the sealing groove 63 through grooves 64 formed in the upper surface of the lower half of the split bearing 15, from the annular chamber 48. A sealing ring 65 of soft metal, such as soft copper, also is arranged on each side of the liquid sealing groove 63 to insure against excessive sealing liquid leakage between these bearing surfaces.

Another liquid seal is provided between the flange 30 on the bearing housing 16 and the bearing supporting ring 27 about the insulating element 31 by a sealing groove 66 formed on the outer surface of the supporting ring and a sealing groove 67 formed on the inner surface of the flange 30. Sealing fluid is supplied to the sealing groove 66 in the supporting ring from the sealing groove 63 through supply passages 68 formed in the supporting ring. Openings 69 are formed through the insulating element 31 which provide communications between the sealing grooves 66 and 67 and provide for the supply of sealing fluid to the sealing groove 67 from the sealing groove 66.

During operation of the dynamo-electric machine lubricant is supplied under pressure between the bearing face 35 and the shaft 13 from the recess 36, the lubricant being supplied to the recess 36 from the lubricant supply conduit 39 through the communicating passage 38. The greater part of the lubricant flows around between the shaft 13 and the bearing face 35, and some also flows toward the outer end of the shaft 13 and is drained into groove 43 to the lubricant sump 42. Some of the lubricant also flows between the bearing face 35 and the shaft 13 toward the interior of the enclosing casing 12 and into the annular recess 56 from which it is drained into the lubricant sump 42.

Sealing liquid is supplied under pressure to the annular chamber 48 and flows through the narrow annular passage 52 and in both directions along the shaft 13 toward the outer end thereof into the annular recess 56 to the lubricant sump 42 and toward the interior of the enclosing casing 12 into the annular recess 53 to the sealing liquid sump 58. The pressure of the sealing liquid supplied to the annular chamber 48 is regulated and maintained at a pressure somewhat in excess of the pressure of the ventilating gas contained in the enclosing casing 12 so that there can be no seepage of the ventilating gas along the shaft 13 and between the shaft and the dividing wall 54.

Due to the fact that the lubricant which accumulates in the lubricant sump 42 has not come into contact with the ventilating gas contained in the enclosing casing 12 and become mixed therewith, this lubricant may be returned directly to the source of lubricant supply for recirculation to the bearing face 35 without the loss of ventilating gas from the enclosing casing 12. However, the sealing liquid which drains into the sealing liquid sump 58 must be treated to liberate the ventilating gas mixed therewith in order to prevent the ventilating gas entrained therein from becoming mixed with the lubricant supply when it is recirculated and flows partly to the lubricant sump.

In order to keep out sealing liquid and lubricant vapors from the machine casing 12, an annular ring 70 is carried by the inner end of the bearing housing 16 and is provided with two spaced-apart annular flanges 71 and 72 formed on the inner edges thereof as labyrinth seals 73 and 74 surrounding the shaft 13. The spaced-apart annular flanges 71 and 72 define an annular chamber 75, which communicates at the lower portion thereof through a drain passage 76 formed in the annular flange 72 with the sealing liquid sump 58.

A bearing lubricant seal including an annular fitting 77 is carried by the outer end of the bearing housing 16 and supports an annular ring 78 provided with two spaced-apart annular flanges 79 and 80 formed on the inner edges thereof as labyrinth seals 81 and 82 surrounding the shaft 13. The spaced-apart annular flanges 79 and 80 define an annular chamber 83 therebetween communicating with the lubricant sump 42 through a drain passage 84 formed through the flange 79.

During operation of the dynamo-electric machine, lubricant which drains into the lubricant sump 42 is drained therefrom through a lubricant drain conduit 86 connected to a lubricant reservoir 87. Lubricant is drawn from the lower portion of the reservoir 87 by a supply pump 88 through a conduit 89 and discharged into lubricant cooler 90 through a conduit 91 and into a main lubricant supply conduit 92 connected to the lubricant supply conduit 39. A ventilating blower 93 is connected by a conduit 94 to the upper portion of the reservoir 87 and exhausts to the atmosphere through a conduit 95 in order to remove lubricant vapors or hydrogen from above the surface of the lubricant in the tank.

Sealing liquid which drains into the sealing liquid sump 58 is drained therefrom through a sealing liquid drain conduit 85 into a main sealing liquid drain conduit 96 which is connected to a by-pass tank 97. This by-pass tank 97 is connected by a conduit 98 to a ventilating gas detraining or liberating tank 99 wherein the ventilating gas entrained in the sealing liquid drained from the sealing liquid sump 58 is liberated therefrom. In order to facilitate the detraining of the ventilating gas from the sealing fluid, a tray 100 is supported adjacent the upper end of the detraining tank 99 above the normal liquid level therein and spaced a small distance inwardly from the surrounding sides of the tank. The pipe or conduit 98 extends into the tank and over the tray 100, so that the sealing fluid flows over the tray and spreads out in a very thin film over the tray, thereby exposing a very large surface which aids in liberating the ventilating gas. The arrangement of the tray allows the sealing fluid to pass slowly from the upper side thereof through the small gap between the edges of the tray and the sides of the tank into the lower part of the tank. The liberated ventilating gas in the detraining tank is returned through the conduit 98 to the by-pass tank 97 and the gas in the by-pass tank 97 returns to the enclosing casing 12 through the main sealing liquid drain conduit 96 and the sealing liquid drain conduit 85. The return of the liberated ventilating gas through the conduits 96 and 85 is made possible by making these conduits of such diameter that they are only partly filled with sealing liquid flowing from the sealing liquid sump 58 toward the by-pass tank 97. Also a conduit 101 is provided which communicates between the upper portion of the by-pass tank 97 and the upper portion of the sealing liquid sump 58 in order to insure that all of the liberated ventilating gas is conducted back into the enclosing casing 12.

In order to prevent the ventilating gas liberating tank 99 from being completely filled with sealing liquid flowing from the by-pass tank 97 through the conduit 98, an overflow conduit 102 is provided adjacent the upper portion of the tank 99. The overflow conduit 102 is connected by a conduit 103 to an air liberating tank 104. The lower portion of the air liberating tank 104 is connected by a conduit 105 to the lower portion of the lubricant reservoir 87, and a valve 106 is arranged in the conduit to close communication between the tank 104 and the reservoir 87 if desired. The overflow conduit 102 is controlled by a float operated valve 107 which is operated to provide communication between the ventilating gas liberating tank 99 and the air liberating tank 104 when the level of the sealing liquid in the tank 99 rises above a predetermined level and is operated to cut off communication between the tank 99 and the tank 104 when the level of the sealing liquid in the tank 99 falls below a predetermined level.

Also, an auxiliary overflow conduit 108 is provided in the ventilating gas liberating tank 99 in order to prevent this tank from being completely filled with sealing liquid in the event of failure of the float operated valve 107 which controls the overflow conduit 102. The conduit 108 enters the tank 104 and terminates in the tank within an upwardly extending conduit 110, which extends below the open end of the conduit 108. The upper end of the conduit 110 is secured to the top wall of the tank 104 and the lower end thereof is open to the liquid contained in this tank. This arrangement allows the excess sealing liquid flowing through the overflow conduit 102 from the ventilating gas liberating tank 99 to be received by the air liberating tank 104 but acts to prevent any ventilating gas passing through the auxiliary overflow conduit 108 from being mixed with the air space contained in the tank 104, as any ventilating gas which leaves the lower end of the downwardly turned portion of the conduit 108 rises within the upwardly extending conduit 110 and is conducted to the atmosphere through a conduit 111. The column of lubricant contained in the air liberating tank 104 exerts a pressure upon the lower end of the downwardly turned portion of the conduit 108 which is greater than the pressure exerted by the ventilating gas contained in the ventilating gas liberating tank 99 upon the upper end of the auxiliary overflow conduit 108 during low pressure operation of the dynamo-electric machine. Any pressure below this hydrostatic head is herein referred to as low pressure operation, and operation at pressures above this value is referred to as high pressure operation. In machines intended only for low pressure operation, the float valve 107 is omitted. Thus, there is no appreciable escape of ventilating gas from the tank 99 through the auxiliary overflow conduit 108 and the connected conduit 103 into the tank 104. When the dynamo-electric machine is operated under high pressure, the connection between the auxiliary overflow conduit 108 and the conduit 103 is shut off by a valve 112 in order to prevent the escape of ventilating gas from the ventilating gas liberating tank 99 through the auxiliary overflow conduit 108 and the connected conduit 103. A conduit 113 connects the upper portion of the air liberating tank 104 to the upper portion of the lubricant reservoir 87, so that any air or gas in the upper portion of the tank 104 passes to the upper portion of the reservoir 87 and is exhausted to the atmosphere by the vapor extractor 93. A normally open ventilating valve 109 is connected to the upper portion of the tank 104 to provide for the ventilation of this tank.

A substantially constant level of sealing liquid is maintained in the ventilating gas liberating tank 99 by a float operated valve 114 disposed in the lower portion thereof and connected by conduit 115 to the upper portion of a sealing liquid reservoir 116. The valve 114 is operated to supply sealing liquid to the reservoir 116 from the tank 99 when the level of the sealing liquid in the tank 99 rises above a predetermined level and is operated to interrupt the supply of sealing liquid to the reservoir 116 from the tank 99 when the level of the sealing liquid in the tank 99 falls below a predetermined level. This sealing liquid supplied to the reservoir 116 from the ventilating gas liberating tank 99 is delivered thereto through a spray nozzle 118 in the form of a spray or in a finely divided state in order to promote the liberation of the entrained ventilating gas therein.

The upper portion of the sealing liquid reservoir 116 is connected by conduit 119 to a vacuum pump 120 arranged to produce a reduced pressure of about ½ inch mercury absolute within the reservoir 116 in order to liberate any ventilating gas or air entrained in the sealing liquid therein. The vacuum pump 120 discharges through a conduit 121 into a liquid separating tank 122 communicating through a conduit 123 with the atmosphere. A valve 124 is arranged in the conduit 119 between the storage reservoir 116 and the vacuum pump 120 so that communication therebetween can be readily controlled.

An arrangement is provided for isolating the ventilating gas liberating tank 99 from the system in order to permit inspection and adjustment of the float operated valves 107 and 114 therein, and includes a valve 125 arranged in the conduit 98 connected between the by-pass tank 97 and the tank 99, a valve 126 arranged in the overflow conduit 102, a third valve 127 arranged in the conduit 115 connected between the tank 99 and the sealing liquid reservoir 116, and the valve 112 arranged in the auxiliary overflow conduit 103. During normal operation of the dynamo-electric machine, a valve 128 in a conduit 129 connecting the by-pass tank to the overflow conduit is closed to prevent the sealing liquid from flowing from the by-pass tank 97 into the conduit 103 connected to the tank 104. When it is desired to isolate the tank 99 from the system the valves 112, 125, 126, 127 are closed and the valve 128 is opened. The sealing liquid in the by-pass tank 97 then flows through the conduit 129 and 103 into the tank 104 from which it is drawn through a conduit 130 into the reservoir 116 to be supplied to the liquid film seals of the dynamo-electric machine. During high pressure operation the valve 128 must be throttled to maintain a constant level of liquid in the by-pass tank 97, as indicated by a glass gauge 192.

In order to make up for the sealing liquid lost from the sealing liquid circulating system and gained by the bearing lubricant circulating system and maintain substantially constant the level of the sealing liquid in the reservoir 116, the air liberating tank 104 is connected by the conduit 130 to the upper portion of the sealing liquid reservoir 116 and a valve 131 is arranged in the conduit 130 to close communication therebetween if desired. The supply of make-up lubricant from the tank 104 to the reservoir 116 through the conduit 130 is controlled by float operated valve 132, and the lubricant is supplied to the upper portion of the reservoir 116 through a spray nozzle 133 in the form of a spray or in a finely divided state in order to promote the liberation of any entrained air therein. This valve is arranged to be opened and to supply lubricant to the reservoir 116 from the tank 104 when the level of the sealing liquid in the reservoir 116 falls below a predetermined level and to be closed to stop the supply of lubricant to the reservoir 116 when the level of the sealing liquid therein rises above a predetermined level. It is desirable that the air in the make-up lubricant should be partially removed before this lubricant is supplied to the reservoir 116. In order to aid in more readily removing any entrained air in the lubricant in the tank 104, a slotted baffle plate 110a extends upwardly in the tank 104 between the inlet 105 to the tank 104 from the lubricant reservoir 87 and the connection of the make-up conduit 130. In passing up and through this slotted baffle some of the larger bubbles of air in the lubricant are liberated, and further liberation of air occurs in the tank as the larger bubbles rise to the surface of the lubricant. This air then is exhausted to the atmosphere through the conduits 113 and 95. The make-up lubricant flows from the tank 104 into the reservoir 116 through the conduit 130 due to the difference in pressures between the lubricant in tank 104 and the sealing liquid in the reservoir 116, as the pressure in the tank 104 is higher than the pressure in the reservoir 116. The supply of sealing liquid into the reservoir 116 through the conduit 115 also may be shut off by a normally open float operated valve 117 if the level of the sealing liquid rises in the reservoir above a predetermined level, as may happen if the withdrawal of sealing liquid from the reservoir is stopped.

The sealing liquid is drawn from the lower portion of the sealing liquid reservoir 116 through a conduit 134 by a sealing liquid supply pump 135, which discharges into a conduit 136. This pump is of the constant displacement type, so that it pumps a predetermined quantity per minute. A valve 137 is arranged in the conduit 134 to shut off communication between the reservoir 116 and the pump if desired. The sealing liquid flows from the conduit 136 through a conduit 138 into a cooler 139 from which it is discharged into a main sealing liquid supply conduit 140. A pair of valves 141 and 142 is provided for isolating the cooler 139 from the conduits 138 and 140. The main sealing liquid supply conduit 140 is connected to the sealing liquid supply conduit 51 and a valve 143 is arranged to control communication therebetween.

The conduit 138 also is connected through a differential pressure operated valve 144 and a conduit 145 to the upper portion of the sealing liquid reservoir 116. The valve 144 is adjusted so that the major portion of the sealing liquid drawn from the lower portion of the sealing liquid reservoir 116 through the conduit 134 and discharged into the conduit 138 is conducted back into the reservoir 116. This returned sealing liquid is discharged into the upper portion of the reservoir 116 in the form of a spray or in a finely divided state. This spray of the sealing liquid is produced by perforated nozzles 146 carried by a conduit 147 connected to the conduit 145. This arrangement promotes the liberation of entrained ventilating gas from the sealing liquid contained in the reservoir 116.

The differential pressure operated valve 144 regulates the pressure of the sealing liquid supplied to the liquid film seals and maintains the pressure of the sealing liquid somewhat in excess of the pressure of the ventilating gas contained in the enclosing casing 12 of the dynamo-electric machine. This valve control is provided by a differential pressure responsive arrangement including a bellows 148 arranged in a cylinder 149. One side of the bellows 148 is subjected to the pressure of the sealing liquid supplied to the liquid film seals by a conduit 150 connected between the sealing liquid supply conduit 51 and one end of the cylinder and the other side of the bellows is subjected to the pressure of the ventilating gas contained in the enclosing casing 12 of the dynamo-electric machine by a conduit 151 connected between the interior of the enclosing casing 12 at the sealing liquid sump and the other end of the cylinder. Valves 152 and 153 are arranged in the conduits 150 and 151 for controlling the connections between these conduits and the cylinder 149.

This arrangement increases the pressure of the sealing lubricant supplied to the liquid film seals upon an increase in the pressure of the ventilating gas contained in the enclosing casing 12 of the dynamo-electric machine by diverting a smaller amount of the sealing liquid from the conduit 136 into the conduit 145. Furthermore, this arrangement decreases the pressure of the sealing liquid supplied to the liquid film seals upon a decrease in the pressure of the ventilating gas contained in the enclosing casing 12 of the dynamo-electric machine by diverting a greater amount of the sealing liquid from the conduit 136 into the conduit 145, as the rate of liquid flow from the constant displacement pump remains substantially constant. The valve 144 thus maintains a substantially constant pressure differential between the pressure of the sealing liquid and the pressure of the ventilating gas contained in the enclosing casing 12 of the dynamo-electric machine.

A by-pass conduit 154 controlled by a pressure relief valve 155 is arranged between the conduit 136 and the conduit 145. The pressure relief valve 155 normally is closed and is arranged to divert sealing liquid around the differential pressure operated valve 144 when the pressure in the conduit 136 exceeds a predetermined value. This arrangement prevents the sealing liquid from being supplied to the liquid film seals under excessive pressure in the event of failure of the valve 144 and protects the pump 135 against excessive pressure in case seal system valves are closed.

In order to scavenge the detraining tank 99, that is, to discharge the gaseous mixture in the tank and replace it with fresh gas to increase the purity of the ventilating gas, a conduit 156 connects the upper portion of this tank to a solenoid operated scavenging valve 157. This valve is controllable manually by a switch having contacts 158 and 159 arranged to connect a solenoid 160 of the valve 157 to a source of electrical power supply 161. The valve 157 is normally kept closed and is arranged to connect the conduit 156 with a conduit 162 which opens to the atmosphere when it is opened. A valve 163 is arranged in the conduit to close off the scavening valve 157 from the detraining tank 99. A valve 164 is connected to the conduit 156 to test the purity of the ventilating gas in the tank 99. If it is desired to increase the purity of the ventilating gas in the machine casing 12, the scavenging valve may be opened and the pressure of the ventilating gas will thereby be decreased so that more gas will be supplied to the machine casing from the supply tank 24 through the conduit 23 and pressure regulating valve 22. The conduit 156 also connects through a valve 164' to a mercury relief valve 165, so that if the pressure within the tank 99 rises above a predetermined value during low pressure operation, the ventilating gas will be discharged from the tank 99 through the valve 165 to the atmosphere through a conduit 166.

An arrangement including a conduit 167 connected between the main sealing liquid supply conduit 140 and the main lubricant supply conduit 92 is provided in order to supply lubricant under pressure to the liquid film seals from the main lubricant supply conduit 92 in the event of failure of the sealing liquid supply. A normally closed solenoid operated valve 168 and a differential pressure operated valve 169 are arranged in the conduit 167 in order to control the flow of lubricant from the main lubricant supply conduit 92 into the main sealing liquid supply conduit 140. An adjustable pressure operated switch 170 is provided for controlling the solenoid operated valve 168 and includes a pair of stationary contacts 171 and a movable bridging contactor 172 to control an electric energizing circuit for connecting an operating solenoid 173 of the valve 168 to the source of electrical power supply 161. The pressure operated switch 170 is controlled by an expansible bellows 174 connected by a conduit 175 to the main sealing liquid supply conduit 140, and normally is held closed by a biasing spring 176 and the pressure of the sealing liquid in the bellows 174. Under these conditions, the solenoid 173 is energized through contacts 177 of a solenoid operated switch 178, which is connected to the source of electrical power supply 161 through the switch 170, and maintains closed the valve 168. In the event of failure of pressure of the sealing liquid in the main sealing liquid supply conduit 140 the expansible bellows 174 is contracted, causing the bridging contactor 172 of the pressure operated switch 170 to move away from the stationary contacts 171 and open the energizing circuit of the solenoid switch 178, and, therefore, to de-energize the solenoid 173 and the valve 168 opens to allow lubricant under pressure from the main lubricant supply conduit 92 to flow through the conduit 167 into the main sealing liquid supply conduit 140 and into the liquid film seals. Adjustment of the tension of the biasing spring 176 provides for the proper operation under high and low pressure conditions.

The differential pressure operated valve 169 operates in a manner similar to that of the differential pressure operated valve 144 and maintains the pressure of the lubricant supplied from the main lubricant supply conduit 92 through the conduit 167 to the liquid film seals at a pressure somewhat in excess of the pressure of the ventilating gas in the enclosing casing 12 of the dynamo-electric machine. The valve 169 is controlled by an arrangement including a bellows 179 arranged in a cylinder 180. One side of the bellows 179 is subjected to the pressure of the lubricant, supplied to the liquid film seals by a conduit 181 connected between the conduit 150 and one end of the cylinder 180, and the opposite side of the bellows 179 is subjected to the pressure of the ventilating gas contained in the enclosing casing 12 of the dynamo-electric machine by a conduit 182 connected between the conduit 151 and the opposite end of the cylinder 180. Valves 183 and 184 are arranged in the conduits 181 and 182, respectively, to control the connections between the cylinder 180 and the conduits 150 and 151. This arrangement including the differential pressure operated valve 169 throttles the flow of lubricant from the main lubricant supply conduit 92 through the conduit 167 to the liquid film seals and maintains a substantially constant pressure differential between the pressure of the lubricant supplied to the liquid film seals and the pressure of the ventilating gas contained in the enclosing casing 12 of the dynamo-electric machine. The arrangement of the conduits 151 and 150 is such that they are continually flooded and full of liquid, and since each connects from substantially the same level on the machine to the cylinders 159 and 180, a balance of the hydrostatic head on the two sides of the pressure regulating valve cylinder is inherently maintained. This also acts to assist in preventing hunting and providing for smooth and stable operation of the valves 144 and 169.

A solenoid operated valve 185 is arranged in the conduit 119 connected between the upper portion of the sealing liquid reservoir 116 and the vacuum pump 120 in order to prevent the vacuum pump from maintaining a low pressure in the reservoir 116 in the event of failure of the sealing liquid supply, as liquid level in the reservoir 116 rises rapidly when the sealing liquid therein is not supplied through the main sealing liquid supply conduit 140 to the liquid film seals. During normal operation of the dynamo-electric machine the valve 185 is maintained in open position by a solenoid 186 connected in parallel circuit relationship with the solenoid 173 and controlled by the pressure operated switch 170. In the event of failure of the sealing liquid supply or the loss of electric power, the electric circuit through the solenoid 186 is opened by the pressure operated switch 170 and the valve 185 is closed. This arrangement prevents the sealing liquid in the reservoir 116 from becoming frothy and being drawn through the conduit 119 into the vacuum pump 120.

Lubricant from the main lubricant supply conduit 92 may also be conducted to the main sealing liquid supply conduit 140 by an arrangement including a conduit 187 connected between the conduit 92 and the upper portion of the conduit 167. A manually controlled valve 188 is arranged in the conduit 187 in order to throttle the flow of lubricant therethrough. This arrangement provides for the supply of lubricant from the main lubricant supply conduit 92 to the main sealing liquid supply conduit 140 under manual control in the event of failure of the differential pressure operated valve 169 arranged in the conduit 167. When lubricant is supplied from the main lubricant supply conduit 92 to the main sealing liquid supply conduit 140 through the conduit 187, the section of the conduit 167 in which the solenoid operated valve 168 and the differential pressure operated valve 169 are arranged may be isolated from the main lubricant supply conduit 92 and the main sealing liquid supply conduit 140 by a pair of valves 189 and 190. A check valve 191 is arranged in the main sealing liquid supply conduit 140 in order to prevent lubricant flowing into the main sealing liquid supply conduit 140 from the main lubricant supply conduit 92 from flowing into the cooler 139.

During operation of the dynamo-electric machine lubricant is supplied under pressure to the bearing face of the bearing element carried by the bearing housing 16 on the left hand side of the dynamo-electric machine, as shown in Fig. 1 from the main lubricant supply conduit 92 through a branch lubricant supply conduit 39 and excess lubricant is drained from the lubricant sump on this side of the dynamo-electric machine into the main lubricant drain conduit 96. In a similar manner, sealing liquid is supplied under pressure to the liquid film seal on the left hand side of the dynamo-electric machine from the main sealing liquid supply conduit 140 through a branch sealing liquid supply conduit 51 and excess sealing liquid is drained from the sealing liquid sump on this side of the dynamo-electric machine into the main sealing liquid drain conduit 96.

When the dynamo-electric machine is standing idle, sealing liquid must be supplied from the main sealing liquid supply conduit 140 through the sealing liquid supply conduits 51 to the liquid film seals in order to prevent the escape of ventilating gas from the enclosing casing 12, although it is not necessary to supply lubricant from the main lubricant supply conduit 92 through the lubricant supply conduits 39 to the bearings of the dynamo-electric machine. Thus, when the dynamo-electric machine is standing idle, the lubricant supply pump 88 may be stopped, but the sealing liquid supply pump 135 and the vacuum pump 120 must be run continuously.

While we have shown a particular embodiment of our invention in connection with a dynamo-electric machine, we do not desire our invention to be limited to the particular construction shown and described, and we intend in the appended claims to cover all modifications within the spirit and scope of our invention.

What we claim as new and desire to secure by Letters Patent of the United States, is:

1. A machine provided with a gas filled enclosing casing and a rotatable member having a shaft extending through said enclosing casing, means for providing a seal about said shaft and for preventing the escape of gas from said enclosing casing, means for supplying sealing liquid under pressure to said seal, means including a drain associated with said seal for removing excess sealing liquid therefrom, means including a tank connected to said drain for liberating the gas entrained in the sealing liquid removed from said seal, said drain being employed to return liberated gas from said tank to said enclosing casing, and means responsive to failure of said sealing liquid supply means for supplying lubricant to said seal.

2. A machine provided with a gas filled casing and a rotatable member having a shaft extending through said enclosing casing, a bearing for said shaft, means for supplying lubricant under pressure to said bearing, means for providing a seal about said shaft and for preventing the escape of gas from said enclosing casing, means for supplying sealing liquid under pressure to said seal, and means responsive to failure of said sealing liquid supply means for supplying lubricant from said lubricant supply means to said seal.

3. A machine provided with a gas filled enclosing casing and a rotatable member having a shaft extending through said enclosing casing, a bearing for said shaft, means for supplying lubricant under pressure to said bearing, means for providing a seal about said shaft and for preventing the escape of gas from said enclosing casing, means for supplying sealing liquid under pressure to said seal, and means responsive to a predetermined decrease in pressure of the sealing liquid supplied to said seal for supplying lubricant from said lubricant supply means to said seal.

4. A machine provided with a gas filled enclosing casing and a rotatable member having a shaft extending through said enclosing casing, a bearing for said shaft, means including a sealing member arranged to carry a portion of the bearing load and rigidly connected to said bearing for providing a seal about said shaft and for preventing the escape of gas from said enclosing casing, means for supplying sealing liquid under pressure to said seal, means including a drain associated with said seal for removing excess sealing liquid therefrom, a sealing liquid reservoir, means for connecting said drain to said sealing liquid reservoir, and means for connecting said sealing liquid reservoir to said sealing liquid supply means.

5. A machine provided with a gas filled enclosing casing and a rotatable member having a shaft extending through said enclosing casing, a bearing for said shaft, means for supplying lubricant under pressure to said bearing, means including a sealing member rigidly connected to said bearing for providing a seal about said shaft and for preventing the escape of gas from said enclosing casing, means for supplying sealing liquid under pressure to said seal, means including a spherical bearing surface for supporting said bearing and said sealing member, and means for supplying sealing liquid from said shaft seal to said spherical bearing surface to provide a liquid seal therein.

6. A machine provided with a gas filled enclosing casing and a rotatable member having a shaft extending through said enclosing casing, a bearing for said shaft, means for supplying lubricant under pressure to said bearing, means for providing a seal about said shaft and for preventing the escape of gas from said enclosing casing, means for supplying sealing liquid under pressure to said seal, a connection between said lubricant supply means and said sealing liquid supply means, means including a solenoid operated valve for controlling said connection, and means including a switch controlled in accordance with the pressure of the sealing liquid supply for controlling said solenoid operated valve.

7. A machine provided with a gas filled casing and a rotatable member having a shaft extending through said enclosing casing, a bearing for said shaft, means for supplying lubricant under pressure to said bearing, means for providing a seal about said shaft and for preventing the escape of gas from said enclosing casing, means for supplying sealing liquid under pressure to said seal, means for regulating the pressure of the sealing liquid supplied to said seal, means responsive to a predetermined decrease in pressure of the sealing liquid supplied to said seal for supplying lubricant from said lubricant supply means to said seal, and means for regulating the pressure of the lubricant supplied to said seal.

8. A machine provided with a gas filled enclosing casing and a rotatable member having a shaft extending through said enclosing casing, means for providing a seal about said shaft and for preventing the escape of gas from said enclosing casing, means for supplying sealing liquid under pressure to said seal, means including a drain associated with said seal for removing excess sealing liquid therefrom, means including a tank connected to said drain for liberating gas entrained in the sealing liquid removed from said seal, means for returning liberated gas from said tank to said enclosing casing, a sealing liquid reservoir, means arranged to connect said tank to said sealing liquid reservoir for maintaining a substantially constant level of sealing liquid in said tank, and means for connecting said sealing liquid reservoir to said sealing liquid supply means.

9. A machine provided with a gas filled enclosing casing and a rotatable member having a shaft extending through said enclosing casing, means for providing a seal about said shaft and for preventing the escape of gas from said enclosing casing, means for supplying sealing liquid under pressure to said seal, means including a drain associated with said seal for removing excess sealing liquid therefrom, means including a tank connected to said drain for liberating gas entrained in the sealing liquid removed from said seal, said drain being employed to return liberated gas from said tank to said enclosing casing, a sealing liquid reservoir, means for connecting said tank to said sealing liquid reservoir, means for connecting said sealing liquid reservoir to said sealing liquid supply means, and means for producing a reduced pressure in said sealing liquid reservoir to liberate entrained gas from the sealing liquid therein.

10. A machine provided with a gas filled enclosing casing and a rotatable member having a shaft extending through said enclosing casing, a bearing for said shaft, means for supplying lubricant under pressure to said bearing, means including a drain associated with said bearing for removing excess lubricant therefrom, a lubricant reservoir connected to said drain, means for connecting said lubricant reservoir to said lubricant supply means, means rigidly connected to said bearing and including a chamber surrounding said shaft for providing a seal about said shaft and for preventing the escape of gas from said enclosing casing, means for supplying sealing liquid under pressure to said seal, means for removing excess sealing liquid from said seal, a sealing liquid reservoir, means arranged to connect said lubricant reservoir to said sealing liquid reservoir for maintaining a substantially constant level of sealing liquid in said sealing liquid reservoir, and means for connecting said sealing liquid reservoir to said sealing liquid supply means.

11. A machine provided with a gas filled enclosing casing and a rotatable member having a shaft extending through said enclosing casing, a bearing for said shaft, means for supplying lubricant under pressure to said bearing, means including a drain associated with said bearing for removing excess lubricant therefrom, means including a lubricant reservoir connected to said drain for collecting lubricant and providing for settling of the collected lubricant and liberation of entrained air, means for connecting said lubricant reservoir to said lubricant supply means, means for providing a seal about said shaft and for preventing the escape of gas from said enclosing casing, means for supplying sealing liquid under pressure to said seal, means including a drain associated with said seal for removing excess sealing liquid therefrom, a sealing liquid reservoir, means for connecting said sealing liquid reservoir to said second mentioned drain, means for connecting said sealing liquid reservoir to said sealing liquid supply means, and means arranged to connect said lubricant collecting means to said sealing liquid reservoir for supplying lubricant to said sealing liquid reservoir.

12. A machine provided with an enclosing casing and a rotatable member having a shaft extending through said enclosing casing, means for supplying gas under pressure to said enclosing casing, means for regulating the pressure of the gas supplied to said enclosing casing, a bearing for said shaft, means for supplying lubricant under pressure to said bearing, means for providing a seal about said shaft and for preventing the escape of gas from said enclosing casing, means for supplying sealing liquid under pressure to said seal, means for maintaining the pressure of the sealing liquid supplied to said seal a predetermined amount greater than the pressure of the gas supplied to said enclosing casing, means responsive to a predetermined decrease in pressure of the sealing liquid supplied to said seal for supplying lubricant from said lubricant supply means to said seal, and means for maintaining the pressure of the lubricant supplied to said seal a predetermined amount greater than the pressure of the gas supplied to said enclosing casing.

13. A machine provided with a gas filled enclosing casing, a rotatable member having a shaft extending through said enclosing casing, means including a bearing for supporting said shaft, means including a lubricant reservoir for supplying lubricant to said bearing, means for providing a seal about said shaft and for preventing the escape of gas from said enclosing casing, means for supplying sealing liquid under pressure to said seal, means including a drain associated with said seal for removing excess sealing liquid therefrom, a detraining tank, means including a tray supported in said tank above the normal liquid level therein and arranged to allow the slow passage of liquid from the upper side thereof into said tank for liberating gas entrained in the liquid removed from said seal, means for connecting said drain to supply sealing liquid to the upper side of said tray, a sealing liquid reservoir, means for supplying sealing liquid from said tank to said sealing liquid reservoir, means for connecting said sealing liquid reservoir to said sealing liquid supply means, and means arranged to conduct sealing liquid from said tank to said lubricant reservoir on the rise of sealing liquid in said tank above a predetermined level.

14. A machine provided with a gas filled enclosing casing and a rotatable member having a shaft extending through said enclosing casing, a bearing for said shaft, means for supplying lubricant under pressure to said bearing, means including a drain associated with said bearing for removing excess lubricant therefrom, a lubricant reservoir connected to said drain, means for connecting said lubricant reservoir to said lubricant supply means, means for providing a seal about said shaft and for preventing the escape of gas from said enclosing casing, means for supplying sealing liquid under pressure to said seal, means including a drain for removing excess sealing liquid from said seal, means including a tank connected to said second mentioned drain for liberating gas entrained in the sealing liquid removed from said seal, means for returning liberated gas from said tank to said enclosing casing, means arranged to connect said tank to said lubricant reservoir for removing excess sealing liquid from said tank, a sealing liquid reservoir connected to said tank, and means for connecting said sealing liquid reservoir to said sealing liquid supply means.

15. A machine provided with a gas filled enclosing casing and a rotatable member having a shaft extending through said enclosing casing, a bearing for said shaft, means for supplying lubricant under pressure to said bearing, means including a drain associated with said bearing for removing excess lubricant therefrom, a lubricant reservoir connected to said drain, means for connecting said lubricant reservoir to said lubricant supply means, means for providing a seal about said shaft and for preventing the escape of gas from said enclosing casing, means for supplying sealing liquid under pressure to said seal, means including a drain associated with said seal for removing excess sealing liquid therefrom, a sealing liquid reservoir, means for connecting said second mentioned drain to said sealing liquid reservoir, means for connecting said sealing liquid reservoir to said sealing liquid supply means, means arranged to supply lubricant from said lubricant reservoir to said sealing liquid reservoir in a finely divided state for maintaining a substantially constant level of sealing liquid in said sealing liquid reservoir, and means for producing a reduced pressure in said sealing liquid reservoir to liberate entrained gas from the lubricant supplied from said lubricant reservoir.

16. A machine provided with an enclosing casing and a rotatable member having a shaft extending through said enclosing casing, means for supplying gas under pressure to said enclosing casing, means for regulating the pressure of the gas supplied to said enclosing casing, a bearing for said shaft, means for supplying lubricant under pressure to said bearing, means for providing a seal about said shaft and for preventing the escape of gas from said enclosing casing, means for supplying sealing liquid under pressure to said seal, means for maintaining the pressure of the sealing liquid supplied to said seal a predetermined amount greater than the pressure of the gas supplied to said enclosing casing, means responsive to a predetermined decrease in pressure of the sealing liquid supplied to said seal for supplying lubricant from said lubricant supply means to said seal, means for maintaining the pressure of the lubricant supplied to said seal a predetermined amount greater than the pressure of the gas supplied to said enclosing casing, and means utilizing a balanced static pressure of lubricant and sealing liquid for providing smooth and stable operation of said pressure maintaining means.

CHESTER W. RICE.
DE WITT S. SNELL.

CERTIFICATE OF CORRECTION.

Patent No. 2,236,274. March 25, 1941.

CHESTER W. RICE, ET AL.

It is hereby certified that error appears in the printed specification of the above numbered patent requiring correction as follows: Page 5, second column, line 20, for "scavening" read --scavenging--; page 8, first column, line 34, claim 11, after the syllable "voir" and before the period insert --when the amount of sealing liquid therein falls below a predetermined level--; and that the said Letters Patent should be read with this correction therein that the same may conform to the record of the case in the Patent Office.

Signed and sealed this 6th day of May, A. D. 1941.

(Seal)

Henry Van Arsdale,
Acting Commissioner of Patents.